United States Patent
Lee (10) Patent No.: US 6,216,893 B1
(45) Date of Patent: Apr. 17, 2001

(54) 2-POST TYPE STORAGE RACK FOR AUTOMATED WAREHOUSES

(76) Inventor: Wan Young Lee, Kwanak Hyundae Apt. 103-202, Bongchun 3-dong, Kwang-gu, Seoul 151-755 (KR)

(*) Notice: Subject to any disclaimer, the term of this patent is extended or adjusted under 35 U.S.C. 154(b) by 0 days.

(21) Appl. No.: 09/521,793

(22) Filed: Mar. 9, 2000

(30) Foreign Application Priority Data

Dec. 12, 1999 (KR) .................................................. 99-58268

(51) Int. Cl.[7] ...................................................... A47F 5/00
(52) U.S. Cl. ........................... 211/189; 211/191; 211/182
(58) Field of Search .................................... 211/189, 190, 211/191, 193, 182

(56) References Cited

U.S. PATENT DOCUMENTS

| 1,359,987 | * | 11/1920 | Hamilton . | |
| 3,241,685 | * | 3/1966 | Shile . | |
| 3,323,655 | * | 6/1967 | Foran et al. . | |
| 3,664,513 | * | 5/1972 | Atwater . | |
| 3,827,377 | * | 8/1974 | Aughtry . | |
| 4,074,811 | * | 2/1978 | Filak | 211/191 |
| 4,319,689 | * | 3/1982 | Clapp | 211/182 |
| 4,541,344 | * | 9/1985 | Nichols | 211/190 X |
| 5,161,701 | * | 11/1992 | Berny | 211/193 |

* cited by examiner

Primary Examiner—Robert W. Gibson, Jr.
(74) Attorney, Agent, or Firm—Sheridan Ross P.C.

(57) ABSTRACT

A 2-post type storage rack for automated warehouses having a dual-directional stacker moving structure is disclosed. In the rack of this invention, front and rear posts are regularly arranged along two longitudinal parallel lines, with a plurality of brace beams connecting the front posts to the rear posts at predetermined positions of the posts. The brace beams integrate the front and rear posts into a single structure and hold the ends of the vertical braces at their middle portions. This storage rack is thus free from conventional inside posts without being ill-affected in structural strength or structural stability. This rack is thus simplified in construction, and so it is remarkably reduced in the amount of material, conserves labor and time while being fabricated. The rack is thus reduced in production cost. This rack is also free from dead areas caused by the inside posts, thereby improving the space utility within the warehouses.

2 Claims, 13 Drawing Sheets

2-POST TYPE STORAGE RACK FOR AUTOMATED WAREHOUSES

FIELD OF THE INVENTION

The present invention relates, in general, to a storage rack for automated warehouses designed to have storage cells formed by regularly arranged horizontal and vertical braces and to allow users to keep and manage large stocks of goods within a warehouse by taking the goods into and out of the warehouses using a stacker, such as a stacker crane, and, more particularly, to a structural improvement in such a storage rack to simplify the construction of the rack while securing a desired structural stability of the rack.

BACKGROUND OF THE INVENTION

As well known to those skilled in the art, an automated warehouse is a building designed to allow a user to keep and manage large stocks of merchandise by taking goods into and out of the warehouse using a stacker. Such an automated warehouse conventionally has a storage rack used for keeping desired goods thereon, with a variety of accessory systems, such as a stacker and a conveyor belt system. Within such a storage rack, the stacker, for example, a stacker crane is used for moving the goods into or out of a warehouse so as to store or deliver the goods. Such a stacker is laid on the storage rack so as to be movable along the rack. Within such automated warehouses, the operation of the stackers and accessory systems is automatically controlled by a computer system.

It is necessary to build such warehouses while accomplishing a desired stable storage of large stocks of goods, a desired improvement in storage efficiency of goods and a stable support for the accessory systems. The automated warehouses are thus typically built in the form of high-story buildings with storage racks having a dual-directional stacker moving structure, wherein a plurality of storage cells are continuously and regularly arranged along two parallel lines in each story of a building while facing each other in the two lines. The storage cells in each line are arranged one after another.

Examples of conventional storage racks having such a dual-directional stacker moving structure are 4-post type storage racks as shown in FIGS. 1a to 1d and 3-post type storage racks as shown in FIGS. 2a to 2d.

Each of the above-mentioned two types of storage racks is referred to the number of posts in each set of posts arranged along a width direction of a rack structure. In the following description, such a set of posts arranged along a width direction of a rack structure will be simply referred to "cross post set." When each cross post set in a storage rack comprises two inside posts, positioned at the central portion, in addition to two outside posts, the rack is so-called "4-post type storage rack" since the number of posts in each cross post set is four (two inside posts+two outside posts). On the other hand, when each cross post set in a storage rack comprises one inside post in addition to two outside posts, the rack is so-called "3-post type storage rack" since the number of posts in each cross post set is three (one inside posts+two outside posts).

As shown in FIGS. 1a to 2d, each of the conventional 4-post and 3-post type storage racks comprises a plurality of posts 1, which are regularly arranged along four longitudinal parallel lines (in the case of 4-post type storage rack) or along three longitudinal parallel lines (in the case of 3-post type storage rack) with regular intervals being defined between the posts 1. Such posts 1 support the vertical load in a storage rack. A plurality of load arms 2 are horizontally and firmly held on the posts 1 at a predetermined height and are used for holding goods thereon. All the posts 1 within each storage rack are connected and integrated together into a single structure by a plurality of lattices 3, horizontal beams 4, horizontal braces 5 and vertical braces 6, and so the rack accomplishes desired horizontal and vertical strength capable of allowing the rack to be free from distortion or buckling.

Figure 1A:
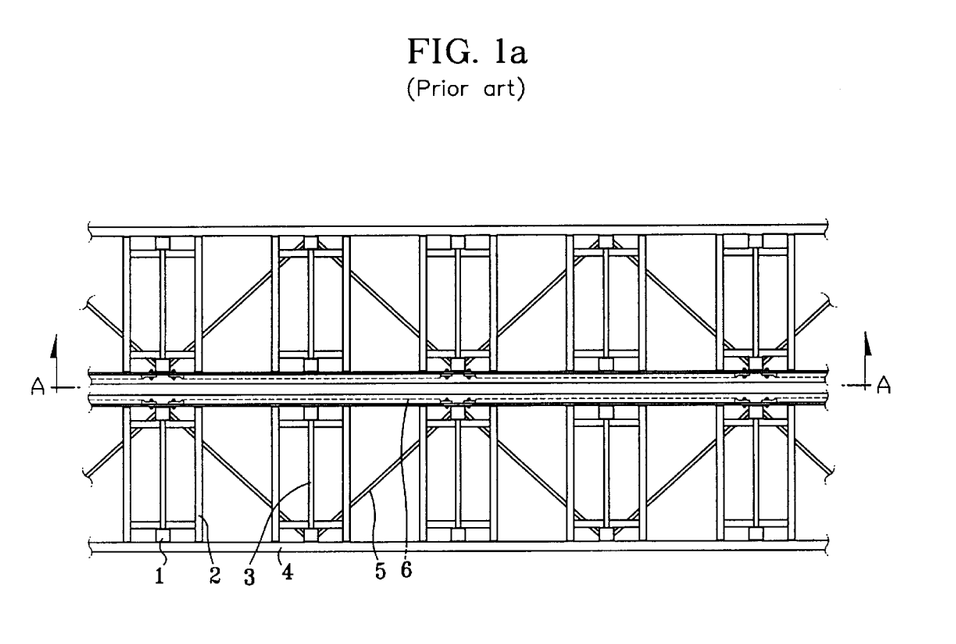
FIG. 1a is a plan view of a conventional 4-post type storage rack.
Figure 1B:
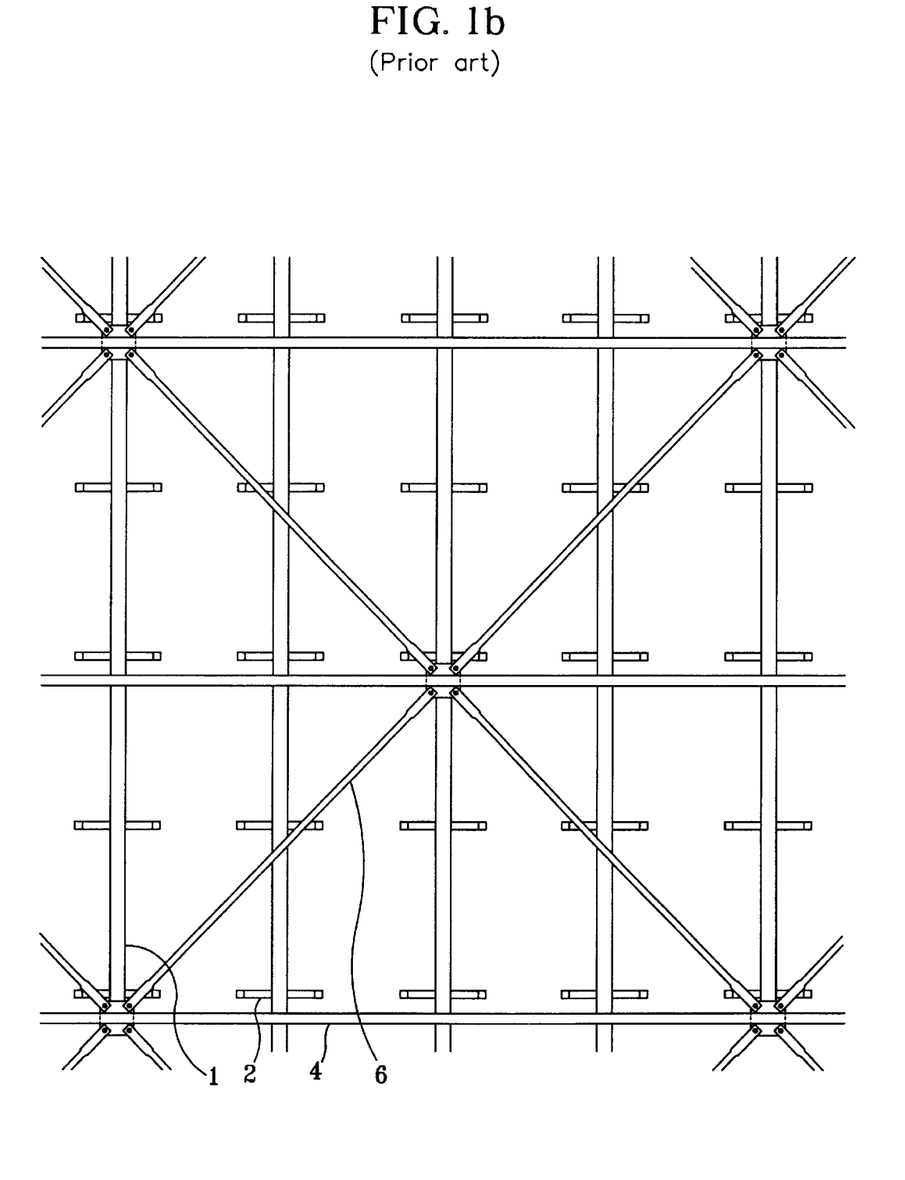
Figure 1C:
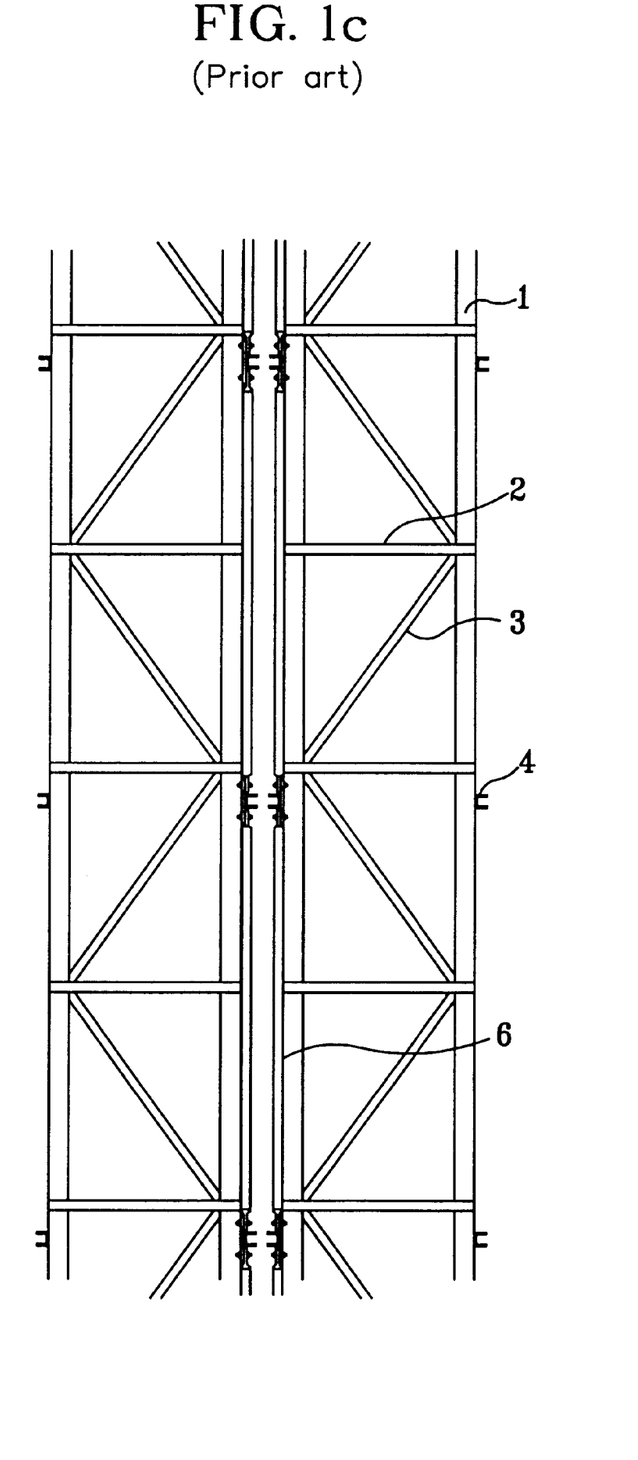
FIG. 1c is a side view of the above 4-post type storage rack.
Figure 1D:
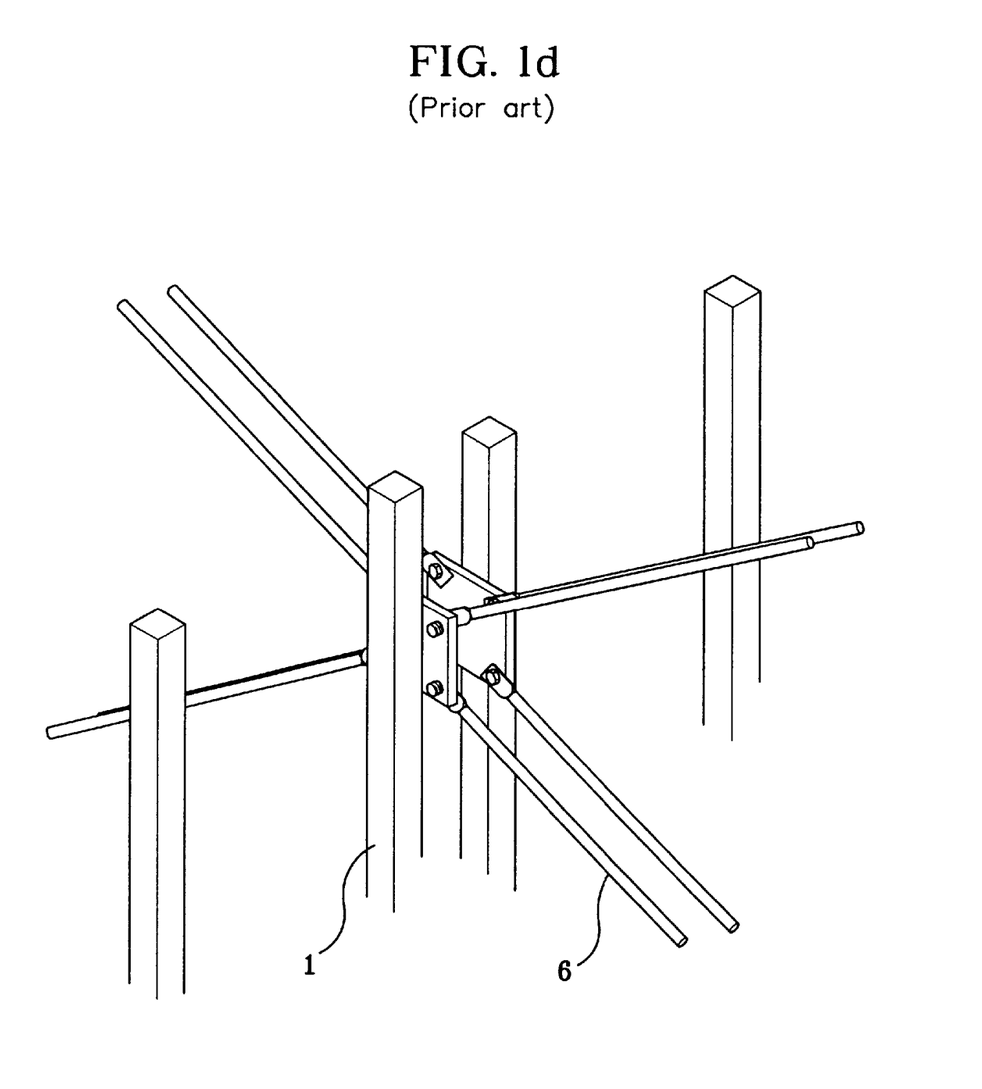
FIG. 1d is a perspective view, showing a vertical brace holding part in the above 4-post type storage rack.
Figure 2A:
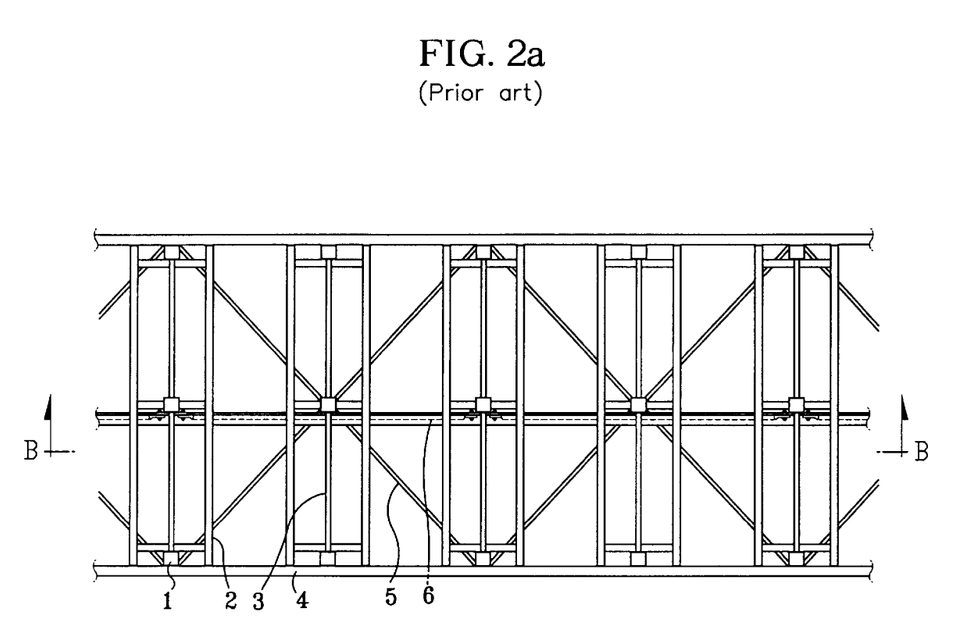
FIG. 2a is a plan view of a conventional 3-post type storage rack.
Figure 2B:
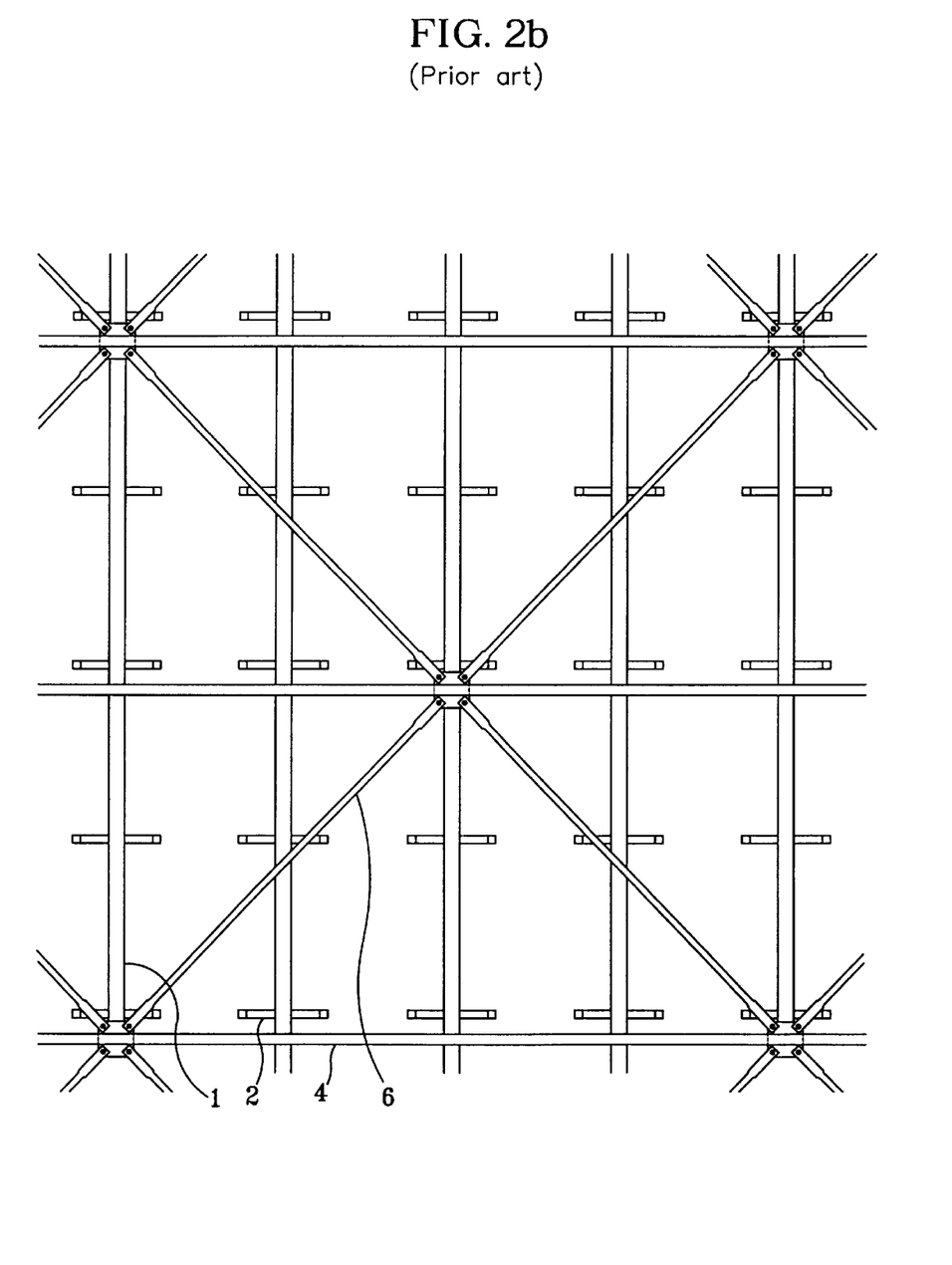
Figure 2C:
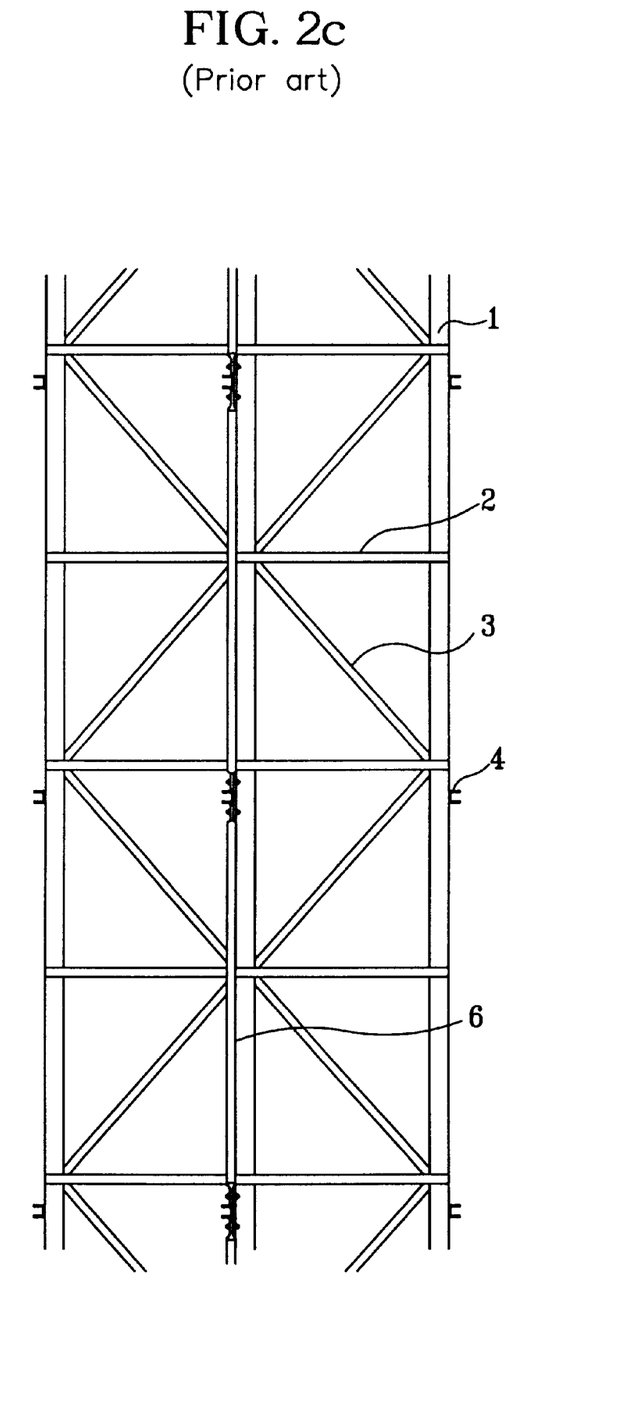
FIG. 2c is a side view of the above 3-post type storage rack.
Figure 2D:
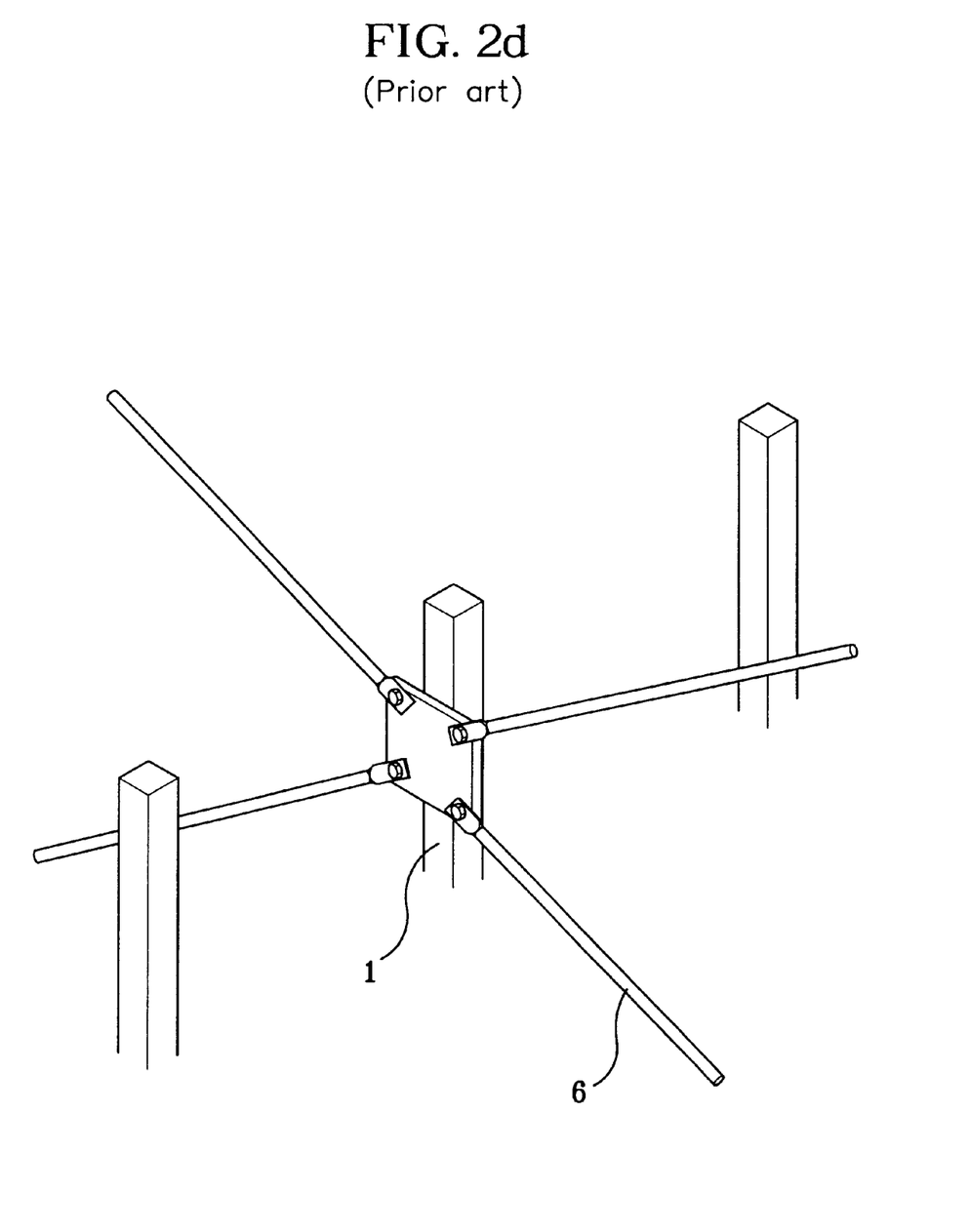
FIG. 2d is a perspective view, showing a vertical brace holding part in the above 3-post type storage rack.
Figure 3:
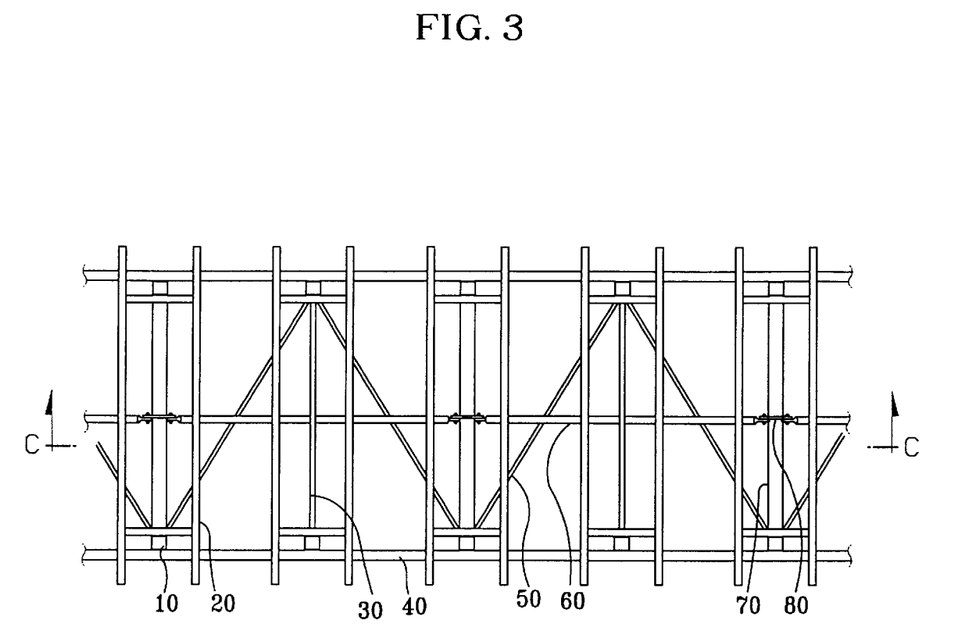
FIG. 3 is a plan view of a 2-post type storage rack in accordance with the preferred embodiment of the present invention.
Figure 4:
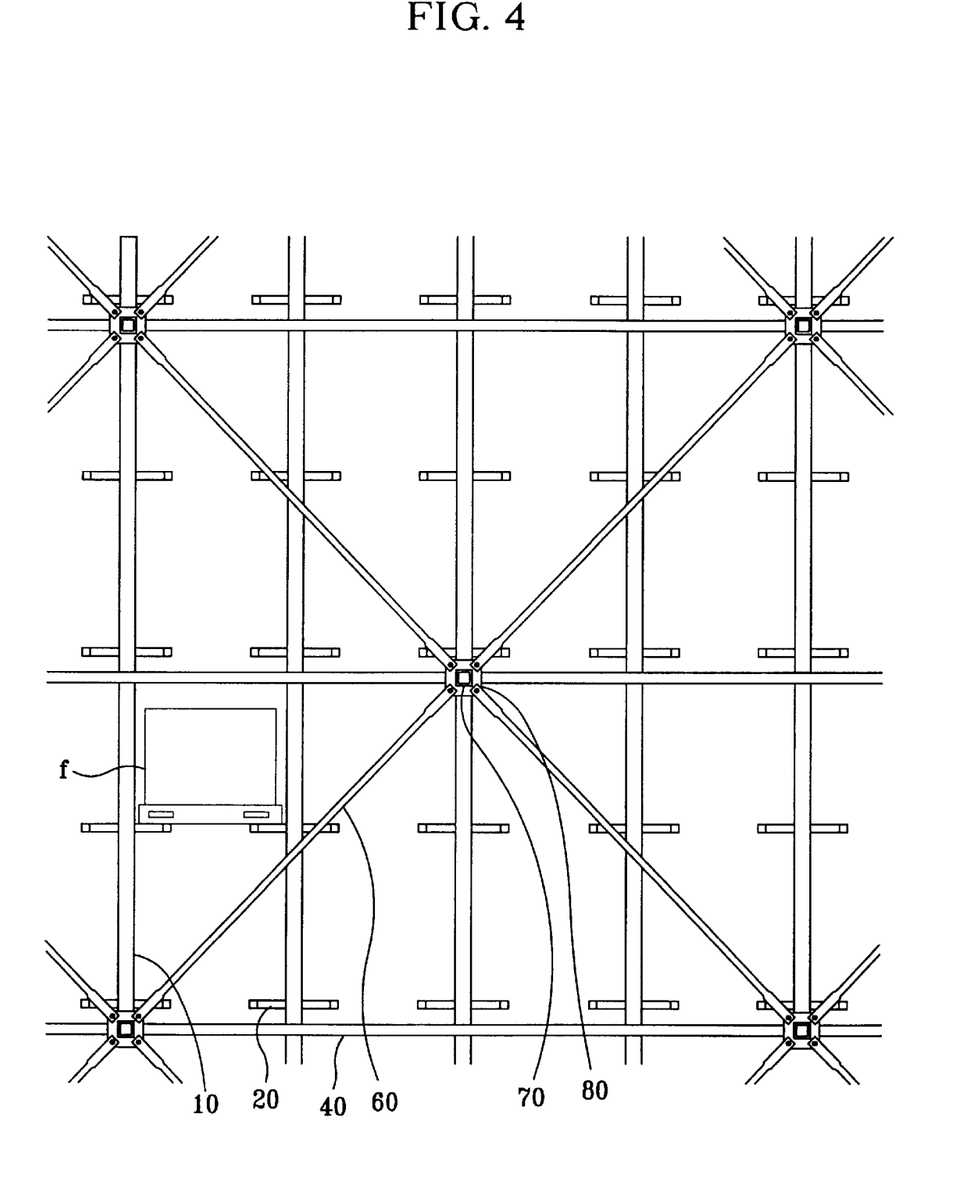
FIG. 4 is a front view of the 2-post type storage rack, viewed from the line C—C of FIG. 3.
Figure 5:
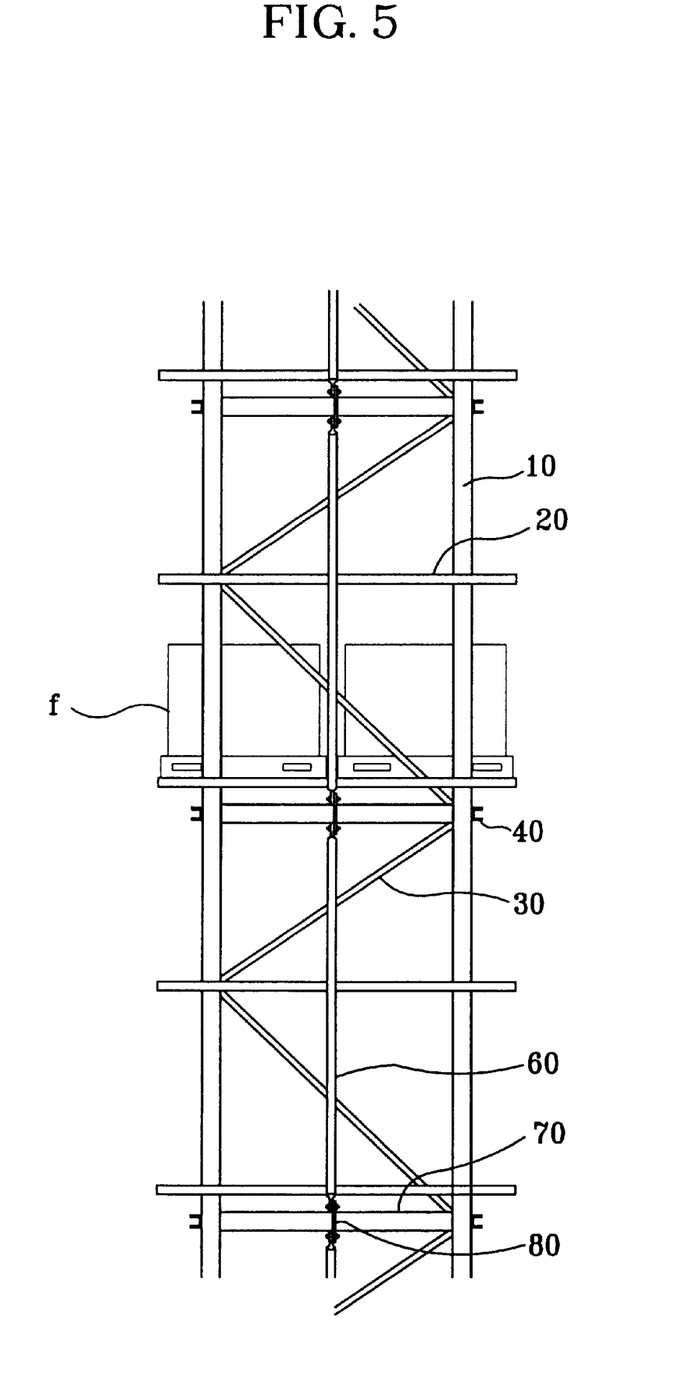
FIG. 5 is a side view of the 2-post type storage rack of this invention.

In such a conventional storage rack, one or two inside posts 1 in addition to two outside posts 2 constitute each cross post set. In the three or four posts 1 of each cross post set, the one or two inside posts 1 form holders for the vertical braces 6 as shown in FIGS. 1d and 2d in addition to partially supporting the vertical load applied to the rack. The above vertical braces 6 are important members necessarily provided in a rack to reinforce the horizontal strength of the rack and to prevent any distortion of the rack structure, and so the vertical brace holding function of the inside post(s) 1 in a conventional rack is very important as follows.

That is, in a storage rack having a dual-directional stacker moving structure, it is inevitable for the vertical braces 6 to be held on the vertical surface(s) of one or two inside posts 1 as shown in FIGS. 1d and 2d since the area around the vertical surface(s) of the inside post(s) 1 or the interfacial area between the two lines of storage cells is free from a forking operational boundary of a stacker crane during a process of taking goods into or out of the storage cells. Therefore, such a conventional storage rack having a dual-directional stacker moving structure has to be fabricated with the inside posts 1.

Due to the structure of holding the vertical braces 6 on the inside posts 1, the conventional 4-post or 3-post type storage racks are problematic as follows.

That is, the inside posts 1 increase the production cost in addition to waste of time and labor while producing the storage racks. This finally reduces productivity and workability while building an automated warehouse having such a storage rack.

The inside posts 1 regrettably form dead areas on the storage racks, thus finally reducing the utility of space in automated warehouses.

It is thus necessary to provide a storage rack for automated warehouses, designed to be free from such inside posts without being ill-affected in its structural strength while having a dual-directional stacker moving structure.

SUMMARY OF THE INVENTION

Accordingly, the present invention has been made keeping in mind the above problems occurring in the prior art, and an object of the present invention is to provide a storage rack for automated warehouses, which supports its vertical braces on a simple beam structure in place of the conventional inside posts, thus having a simple construction without being ill-affected in its structural strength, and which is remarkably reduced in the amount of material, conserves labor and time while being fabricated, and which removes the dead areas caused by the conventional inside posts, thus improving the space utility within the warehouses.

In order to accomplish the above object, the present invention provides a storage rack for automated warehouses having a dual-directional stacker moving structure, comprising a plurality of posts regularly arranged along a plurality of longitudinal parallel lines, with regular intervals being defined between the posts arranged in each line, the posts supporting a vertical load in the storage rack, a plurality of load arms horizontally held on the posts at predetermined heights and used for supporting goods thereon, and a plurality of lattices, horizontal beams, horizontal braces and vertical braces connecting and integrating the posts together into a single structure while accomplishing desired horizontal and vertical strength of the rack so as to allow the rack to be free from distortion or buckling, wherein the posts consist of front and rear posts regularly arranged along two longitudinal parallel lines, with a plurality of brace beams connecting the front posts to the rear posts at predetermined positions of the posts, thus integrating the front and rear posts into a single structure and holding ends of the vertical braces at their middle portions.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a front view of the above 4-post type storage rack, viewed from the line A—A of FIG. 1a;

FIG. 2b is a front view of the above 3-post type storage rack, viewed from the line B—B of FIG. 2a;

DETAILED DESCRIPTION OF PREFERRED EMBODIMENTS

Referring to FIGS. 3 to 7, there are shown a 2-post type storage rack having a dual-direction stacker moving structure in accordance with the preferred embodiment of this invention. As shown in the drawings, the storage rack of this invention comprises a plurality of front and rear posts 10. The above front and rear posts 10 are regularly arranged along two longitudinal parallel lines, or front and rear lines, with regular intervals being defined between the posts 10 arranged in each line, and support a vertical load in the rack. A plurality of load arms 20 are horizontally and firmly held on the front and rear posts 10 at predetermined heights and are used for supporting goods "f" thereon. All the posts 10 within the storage rack are connected and integrated together into a single structure by a plurality of lattices 30, horizontal beams 40, horizontal braces 50 and vertical braces 60, and so the rack accomplishes desired horizontal and vertical strength capable of allowing the rack to be free from distortion or buckling.

The storage rack of this invention is characterized in that the front and rear posts 10 are regularly arranged along the two longitudinal parallel lines, with a plurality of brace beams 70 alternately connecting and integrating the posts 10, arranged in the two longitudinal lines, together into a single structure while extending along a zigzag passage and the ends of the vertical braces 60 being held on the middle portions of the brace beams 70.

In the above storage rack of this invention, each of the posts 10, road arms 20, lattices 30, horizontal beams 40, horizontal braces 50 and vertical braces 60 is constructed and has an operational function as follows.

The front and rear posts 10 are regularly arranged along the two longitudinal parallel lines and support a vertical load in the rack. The load arms 20 are used for holding goods thereon. These load arms 20 are fabricated as a plurality of frames, each of which is horizontally and firmly held on the opposed surfaces of two posts 10 of each cross post set at a predetermined height. In the rack of this invention, two load arm frames hold opposite sides of the bottom of desired merchandise "f" thereon.

The lattices 30 integrate the front posts 10 with the rear posts 10 into a single structure while extending along a zigzag passage, thus allowing the storage rack to resist a lateral load and preventing the rack from a buckling.

The horizontal beams 40 horizontally extend while being firmly attached to the posts 10, arranged in each of the two lines, at several portions, thus integrating the posts 10 together into a single structure. The horizontal beams 40 reinforce the horizontal strength of the rack and prevent a lateral buckling of the posts 10.

In the preferred embodiment of this invention, the horizontal beams 40 are installed in the storage rack in a way such that one horizontal beam 40 is installed within each two stories of the load arm frames.

The horizontal braces 50 are connected to the front and rear posts 10 at the same heights of the horizontal beams 40 and horizontally extend in a zigzag passage, thus securing a desired horizontal strength of the rack and preventing a distortion of the rack.

Figure 6:
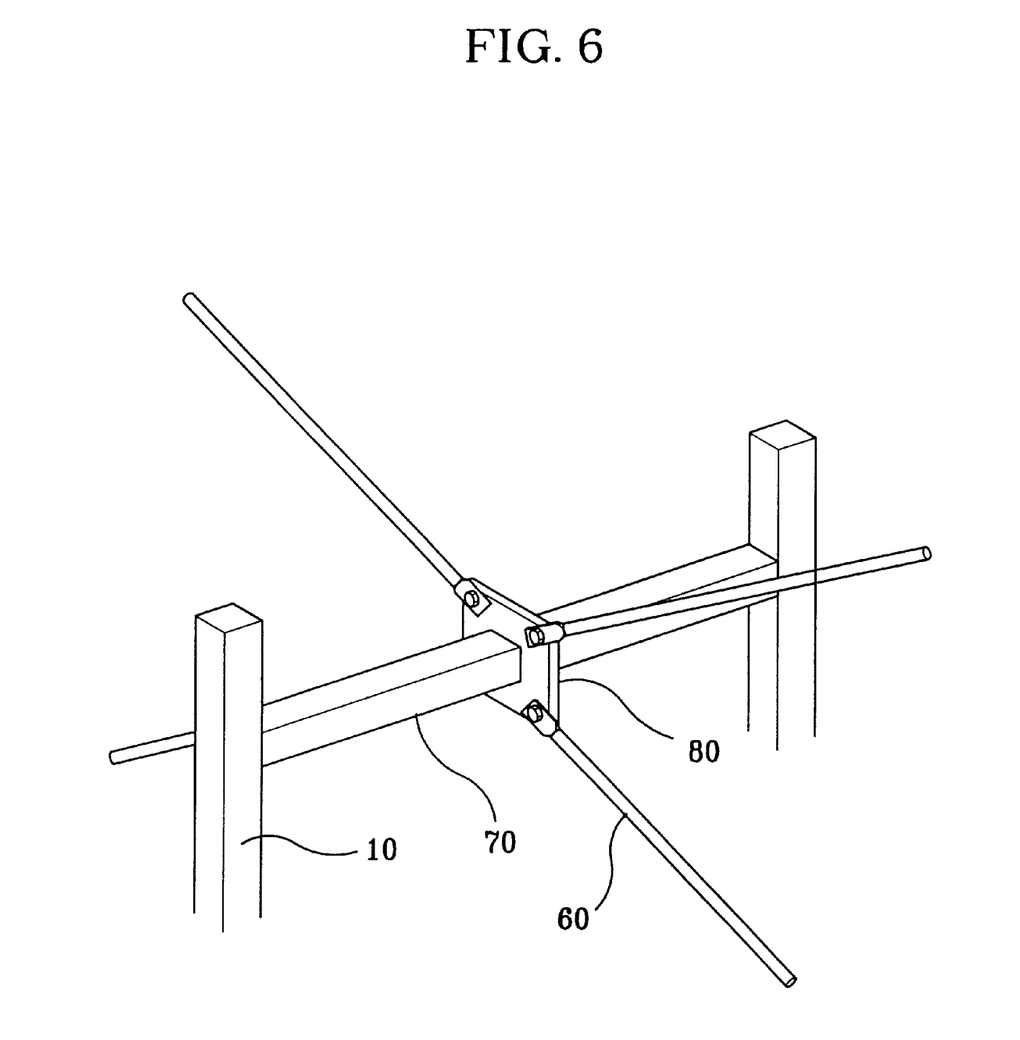
FIG. 6 is a perspective view of the 2-post type storage rack of this invention.
Figure 7:
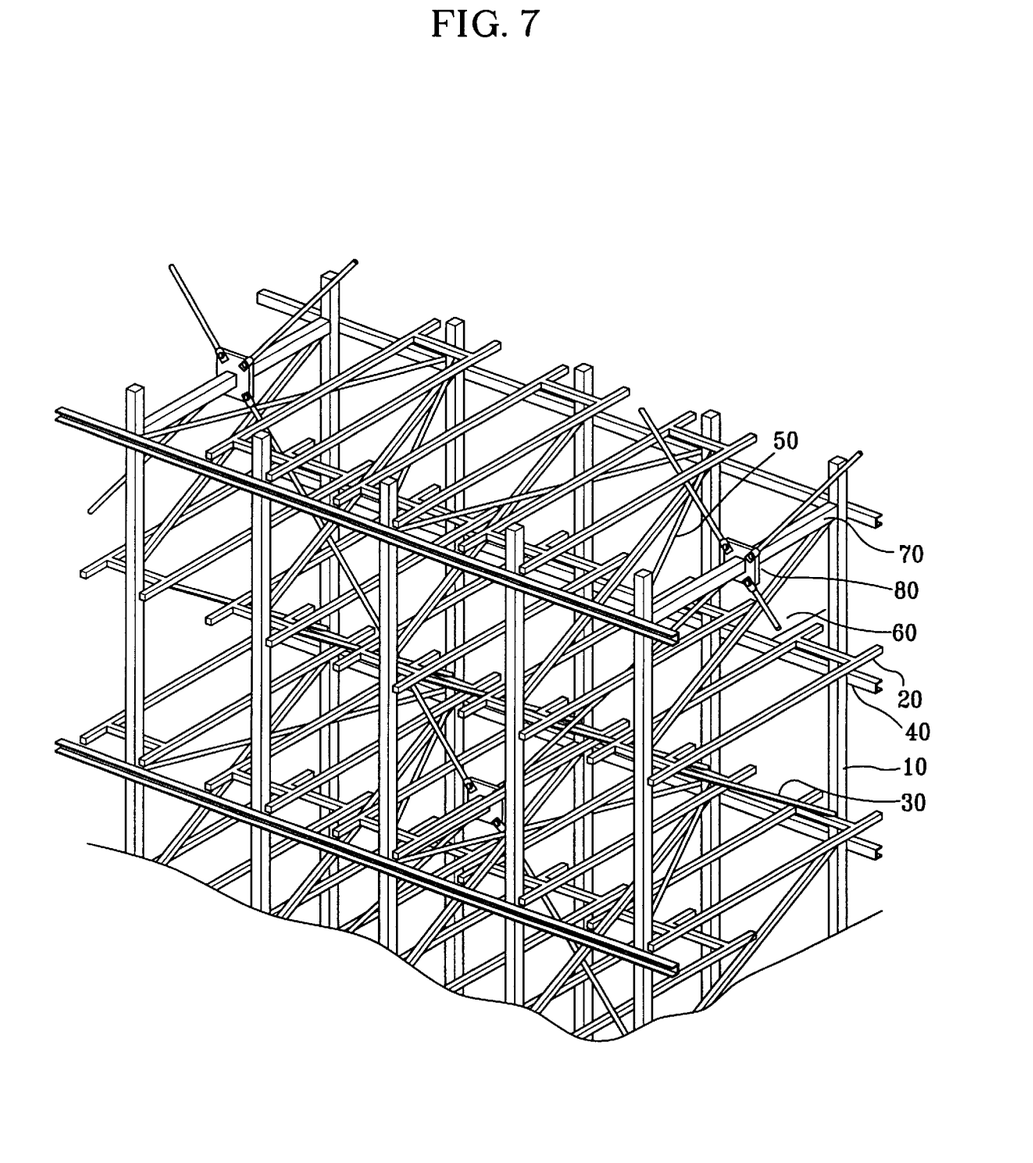
FIG. 7 is a perspective view, showing a vertical brace holding part in the 2-post type storage rack of this invention.

The vertical braces 60 are connected to a plurality of brackets 80, firmly held on the middle portions of the brace beams 70, while diagonally extending in the rack. That is, four vertical braces 60 are held on the four corners of each square plate bracket 80 while diagonally extending in the rack, thus reinforcing the horizontal strength in the horizontal surface formed by the horizontal braces 50.

The above vertical braces 60 are held on the vertical interfacial surface between the front and rear storage cells since the vertical interfacial surface is free from a forking operational boundary of a stacker crane during a process of taking goods into or out of the storage cells in the storage rack having a dual-directional stacker moving structure.

The brace beams 70 horizontally extend between the front and rear posts 10 at predetermined heights and are integrated with the posts 10 into a single structure while providing a holding base for the vertical braces 60. The brace beams 70 transmit stress from the vertical braces 60 to the posts 10.

The above brace beams 70 are made of appropriate conventional steel products, for example, steel pipes having a square or circular cross-section, which effectively resist a distortion and have a desired isotropic bending strength. The integration between the brace beams 70 and the posts 10 is accomplished by a welding process, which allows a torque or bending force acting on the vertical braces 60 to be smoothly transmitted to the posts 10.

A square plate bracket 80 is firmly held on the middle portion of each brace beam 70, with four vertical braces 60 being mounted to the four corners of the bracket 80 at their ends using locking bolts while diagonally extending in the rack.

The above-mentioned 2-post type storage rack of this invention is free from conventional inside posts, but has the brace beams 70 connecting the front and rear posts 10 to each other into a single structure at desired positions. A square plate bracket 80 is held on the middle portion of each brace beam 70, while the vertical braces 60, used for reinforcing the horizontal strength of the rack, are connected to the brackets 80 at their ends while diagonally extending in the rack. It is thus possible to simplify the construction of the storage rack having a dual-directional stacker moving structure.

As described above, the present invention provides a 2-post type storage rack for automated warehouses. This storage rack has a dual-directional stacker moving structure and is free from conventional inside posts, thus being simplified in construction without being ill-affected in structural strength or structural stability. In the storage rack of this invention, vertical braces are held on brace beams in place of conventional inside posts. This storage rack is thus remarkably reduced in the amount of material, conserves labor and time while being fabricated, and so it is possible to reduce the production cost of such storage racks. This storage rack is also free from dead areas caused by the inside posts, thus improving the space utility within the warehouses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A storage rack for automated warehouses having a dual-directional stacker moving structure, comprising a plurality of posts regularly arranged along a plurality of longitudinal parallel lines, with regular intervals being defined between the posts supporting a vertical load in said storage rack, a plurality of load arms horizontally held on said posts at predetermined heights and used for supporting goods thereon, and a plurality of lattices, horizontal beams, horizontal braces and vertical braces connecting and integrating said posts together into a signal structure while accomplishing desired horizontal and vertical strength of the rack so as to allow the rack to be free from distortion or buckling, wherein:

said posts comprise front and rear posts regularly arranged along two longitudinal parallel lines, a plurality of brace beams arranged between said front and rear posts for alternately connecting and integrating said posts together into a single structure, a plurality of horizontal braces and a plurality of vertical braces connected to the front and rear posts at the same height of the horizontal beams and extended in a zigzag passage, said vertical braces connected to a plurality of square plate brackets to hold ends of said brackets at a middle portion of said brace beams and said vertical braces diagonally extended in said rack.

2. The storage rack according to claim 1, wherein said square plate bracket is held on the middle portion of each of said brace beams, a predetermined number of vertical braces are mounted to the corners of said bracket at their ends using locking bolts, and said vertical braces are thus finally held on the middle portions of said brace beams.

* * * * *